United States Patent
Haubs et al.

(10) Patent No.: US 6,818,132 B2
(45) Date of Patent: Nov. 16, 2004

(54) METHOD AND DEVICE FOR SEPARATING SOLIDS FROM A LIQUID PHASE

(75) Inventors: Michael Haubs, Bad Kreuznach (DE); Reinhard Wagener, Hofheim (DE)

(73) Assignee: Ticona GmbH (DE)

( * ) Notice: Subject to any disclaimer, the term of this patent is extended or adjusted under 35 U.S.C. 154(b) by 121 days.

(21) Appl. No.: 10/168,269

(22) PCT Filed: Dec. 13, 2000

(86) PCT No.: PCT/EP00/12665
§ 371 (c)(1),
(2), (4) Date: Oct. 1, 2002

(87) PCT Pub. No.: WO01/43846
PCT Pub. Date: Jun. 21, 2001

(65) Prior Publication Data
US 2003/0150804 A1 Aug. 14, 2003

(30) Foreign Application Priority Data
Dec. 17, 1999 (DE) .......................... 199 61 143

(51) Int. Cl.$^7$ .............................. B01D 11/02
(52) U.S. Cl. ...................... 210/634; 210/511; 210/513; 210/801; 562/485
(58) Field of Search ................................ 210/511, 513, 210/634, 801, 804; 134/25.5; 422/256–259; 525/534–537; 562/485, 486

(56) References Cited

U.S. PATENT DOCUMENTS

| | | | | |
|---|---|---|---|---|
| 4,028,462 A | * | 6/1977 | Domic et al. | ................. 423/24 |
| 4,162,215 A | | 7/1979 | Klotz | |
| 4,201,871 A | | 5/1980 | Tanouchi et al. | |
| 4,290,998 A | * | 9/1981 | Dick et al. | .................. 422/193 |
| 4,529,795 A | * | 7/1985 | Mayer et al. | ............... 528/501 |
| 4,696,114 A | | 9/1987 | Duval | |
| 5,008,450 A | * | 4/1991 | Yamamoto et al. | ......... 562/485 |
| 5,143,554 A | * | 9/1992 | Koyama et al. | ........... 134/25.5 |
| 5,328,615 A | * | 7/1994 | Pacheco et al. | ............. 210/634 |
| 5,564,574 A | * | 10/1996 | Kuryluk | ..................... 209/731 |
| 5,575,918 A | * | 11/1996 | Virnig et al. | ............... 210/652 |
| 5,712,412 A | | 1/1998 | Inary et al. | |
| 6,528,546 B2 | * | 3/2003 | Lee et al. | ..................... 521/48 |

FOREIGN PATENT DOCUMENTS

DE        19810565        9/1999

* cited by examiner

Primary Examiner—Joseph Drodge
(74) Attorney, Agent, or Firm—Connolly Bove Lodge & Hutz LLP

(57) ABSTRACT

The present invention relates to a process and an apparatus for separating separating polymeric from one or more by-products of preparation of the polymer and a first liquid phase, wherein the solid in a first liquid phase is brought into contact with a second liquid phase and the solid is transferred into the second liquid phase. The solid is washed in countercurrent and at least partial displacement washing takes place during the washing of the solid.

19 Claims, 3 Drawing Sheets

METHOD AND DEVICE FOR SEPARATING SOLIDS FROM A LIQUID PHASE

BACKGROUND OF THE INVENTION

The present invention relates to a process and an apparatus for separating solids from a liquid phase.

The separation of solids from a liquid phase is a task which frequently has to be carried out in industry. An example which may be mentioned is the separation of aluminum hydroxide crystals from the basic mother liquor. In the separation, it is important to free the solid as completely as possible of the liquid phase without large amounts of dilute washing liquor being obtained.

A particular separation problem occurs when the liquid phase has to be separated virtually completely (>99%) from the solid. The liquid phase frequently contains nonvolatile components which have to be separated off. In this case, drying of the solid does not solve the separation problem. Rather, the solid needs to be washed without dilute washing liquors being obtained. This is the case in the preparation of some high-performance polymers in high-boiling solvents. The process of the invention is of particular relevance to polymers which are prepared in a high-boiling solvent with formation of salts or acids or bases which have to be neutralized subsequently. Examples of such processes are the preparation of polyaramides from diamines and diacid chlorides, of polycarbonates from diphenols or diphenoxides and phosgene, of polysulfones, polyether sulfones or polyether ketones from diphenoxides and dihalogenated aromatic hydrocarbons or the preparation of polyarylenesiloxanes from diaryldichlorosilanes and diphenoxides. In particular, the term high-performance polymers encompasses polyarylene sulfides.

In the preparation of poly(p-phenylene) sulfide (PPS), the polymer has to be freed of high-boiling N-methylpyrrolidone (NMP) and undissolved and dissolved by-products. The proportion of residual solvent (NMP) in the polymer should be less than 100 ppm. The generation of dilute NMP-containing washing liquors would require a high outlay for distillation and therefore has to be avoided.

According to the prior art, separation can be carried out by means of filtration and subsequent washing of the filter cake. However, substantial volumes of washing liquid are necessary to achieve virtually complete removal of the liquid phase from the solid and have to be worked up at considerable cost.

Vaporization of the solvent from the solid/liquid mixture, if appropriate at elevated temperature, is likewise known. In the case of high-boiling solvents such as NMP, this is time-consuming and costly. In addition, nonvolatile impurities remain in the PPS solid and have to be removed in a further process step.

SUMMARY OF THE INVENTION

From an economic point of view, carrying out the above-mentioned separation task in a continuously operating separation apparatus continues to be of interest.

It is an object of the present invention to provide a process and an apparatus for separating solids from solid/liquid mixtures, with the liquid phase being separated off from the solid virtually completely without a large amount of dilute washing liquor being obtained.

The object of the present invention is achieved by the solid in a first liquid phase being brought into contact with a second liquid phase in countercurrent and the solid being transferred into the second liquid phase.

The process of the invention is carried out by bringing the solid in the first liquid phase into contact with a second liquid in countercurrent in an apparatus which has at least one solid/liquid inlet (1), at least one solid/liquid outlet (4), at least one liquid inlet (3) and at least one liquid outlet (2) (cf. FIG. 1 and FIG. 3).

The solid in the first liquid phase is fed into the solid/liquid inlet (1). The second liquid phase is fed into the liquid inlet (3). The solid is almost completely discharged in the second liquid phase through the solid/liquid outlet (4). The first liquid phase is virtually completely discharged through the liquid outlet (2).

In the process of the invention, only small amounts of the first liquid phase are discharged together with the solid in the second liquid phase through the solid/liquid outlet (4). The proportion of first liquid phase, based on the second liquid phase, in the solid/liquid mixture discharged through the outlet (4) is less than 50% by weight, preferably less than 10% by weight and particularly preferably less than 1% by weight.

In the process of the invention, the first liquid phase is not greatly diluted with the second liquid phase. The proportion of second liquid phase, based on the first liquid phase, in the liquid discharged through the outlet (2) is less than 80% by weight, preferably less than 50% by weight, particularly preferably less than 30% by weight.

In general, only small amounts of solid are carried out in the liquid discharged through the outlet (2) in the process of the invention. This proportion of solid is, based on the solid introduced through the solid/liquid inlet (1), preferably less than 30% by weight, particularly preferably less than 10% by weight.

In the process of the invention, the solid travels through the apparatus by sedimentation under gravity. In a preferred embodiment of the invention, the solid of the solid/liquid mixture is sedimented at least once in an apparatus and the sedimented solid is washed in countercurrent with a second liquid phase.

In the process of the invention, the first liquid phase is preferably an organic solvent and the second liquid phase is preferably water. Organic solvents used are, for example, dipolar aprotic solvents, preferably NMP.

In the process of the invention, the first and second liquid phases are preferably miscible.

The solid can consist of one or more components. The main constituent of the solid is preferably a polymer such as a polyarylene sulfide, very particularly preferably PPS.

The process of the invention can also separate mixtures of solids it the constituents have different solubilities in the first and second liquid phases.

Preference is given to the main constituent of the solid dissolving neither in the first liquid phase nor in the second liquid phase. Secondary constituents of the solid or of the first liquid phase which are to be separated off preferably have a good solubility in the second liquid phase.

In a particularly preferred embodiment, a polymer which is to be separated off and to be purified, for example PPS, is insoluble in the first and second liquid phases under the conditions of the process of the invention, while the impurities to be removed, for example salt and high-boiling solvent, dissolve in the second liquid phase.

A particular advantage of the process of the invention is that it offers the opportunity of the separating off the solid continuously even at elevated temperature and under superatmospheric pressure.

In the process of the invention, the density of the solid is different from the density of the first liquid phase and of the second liquid phase.

The object is achieved by a process in which the apparatus of the process of the invention comprises at least one top section, at least one bottom section and at least one middle section having n sedimentation trays.

A first preferred embodiment of the invention is a process using an apparatus which has at least one sedimentation tray (ST) which comprises at least one sedimentation funnel having a sediment outlet, at least one flow zone and at least one supernatant liquid outlet.

The solid is sedimented on each sedimentation tray in the sedimentation funnel and washed in the flow zone. This is repeated sequentially in n stages. The sedimentation tray has a funnel-like construction and ends in a bottom outlet which represents the solid/liquid outlet. The top section has an inlet for the solid/liquid mixture which leads to the uppermost sedimentation tray. The top section also has an outlet for discharge of the supernatant liquid from the uppermost sedimentation tray.

The apparatus of the process of the invention makes it possible to separate the solid from the mixture in such a way that the proportion of the first liquid phase which is carried out with the solid can be reduced by increasing the number of sedimentation trays.

The sedimentation trays are arranged above one another. The supernatant liquid outlet of one sedimentation tray is connected to the flow zone of the next sedimentation tray above it. The supernatant liquid of a sedimentation tray comprises a mixture of the first and second liquid phases. In the flow zone, the supernatant liquid passes through the sedimenting solid in a precisely defined geometric arrangement and effects at least partial displacement washing of the solid. In this way, the supernatant liquid of one sedimentation tray is used as washing liquid for the sedimentation tray above it. Fresh washing liquid is fed into the flow zone of the bottommost sedimentation tray through the liquid inlet (3) in the form of pure second liquid phase. While the solid passes through the apparatus of the process of the invention from the top downward, the washing liquid flows from the bottom upward. This countercurrent principle enables extraordinarily effective separation of the first liquid phase from the solid to be achieved.

The geometric arrangement of the flow zone is selected so that the solid does not sediment in a direction directly opposite to the flow of the ascending washing liquid in the individual sedimentation trays. The passage of the solid into the next sedimentation tray is not hindered by the washing liquid which passes through the apparatus in countercurrent, since the washing liquid is conveyed through separate supernatant liquid outlets to the flow zone of the next higher sedimentation tray. In this way, largely unimpeded sedimentation is achieved, as a result of which solids having a low sedimentation velocity can also be separated off.

The separation efficiency of the apparatus of the process of the invention depends essentially on the number of sedimentation trays. The separation efficiency can be matched to the respective separation task via the number of sedimentation trays. The separation efficiency increases with increasing number of sedimentation trays.

A preferred embodiment of the invention is an apparatus having n sedimentation trays, where n is an integer from 2 to 1000.

A particularly preferred embodiment of the invention is an apparatus in which n is an integer from 3 to 200.

A very particularly preferred embodiment of the invention is an apparatus in which n is an integer from 4 to 100.

A second preferred embodiment of the invention is a process using an apparatus which comprises a straight tube having a centered stirrer shaft. The stirrer shaft bears a cross-arm agitator having at least one level. A plurality of stirrer blades or stirrer arms are arranged in one horizontal plane of the cross-arm agitator.

While the solid entering through the solid/liquid inlet travels through the apparatus of the process of the invention from the top downward, the washing liquid flows from the bottom upward. By means of displacement of the first liquid phase by the second liquid phase, which increases continuously from the top downward, it is possible to separate the solid from the mixture in such a way that the proportion of the first liquid phase which is carried out with the solid can be reduced. Fresh washing liquid is fed to the apparatus at the lower end of the middle section through the liquid inlet (3) in the form of pure second liquid phase. As a result of this countercurrent principle, extraordinarily effective separation of the first liquid phase from the solid is achieved.

The geometric arrangement of the cross-arm agitator is chosen so that it largely suppresses stream formation in the ascending liquid phase 2. In particular, the stirrer blades reach almost to the inside wall of the straight tube. Stream formation would impair the washing efficiency of the process of the invention. At least two stirrer blades or stirrer arms per level of the cross-arm agitator have been found to be useful. In a preferred embodiment, the cross-arm agitator bears from three to eight, particularly preferably four, stirrer blades or stirrer arms per level.

The separation efficiency of the apparatus of the process of the invention depends essentially on the number and spacing of the levels of the cross-arm agitator. The separation efficiency can be matched to the respective separation task via the number of levels. The separation efficiency increases with increasing number of levels.

During operation, the cross-arm agitator turns at a moderate speed. The speed of rotation is typically from 0.1 to 1000 rpm, preferably from 1 to 200 rpm and particularly preferably from 5 to 50 rpm.

It is frequently advantageous for the uppermost sedimentation tray or the top section of the apparatus to have a greater diameter than the sedimentation trays lower down. This measure reduces the proportion of solid in the liquid discharged through the outlet (2) which forms the supernatant liquid outlet of the uppermost sedimentation tray.

Suitable solid/liquid mixtures are mixtures in which the solid sediments under the force of gravity. The upper limit to the solids content is determined by the flowability of the mixture. The apparatus can separate off very small proportions of solid too.

The density of the solid differs from the density of the liquid phase. The sedimentation velocity of the solid in the liquid phase should be greater than 1 mm/min. The velocity at which a solid sinks is dependent on the density different between it and the liquid phase, the mean particle size, the particle size distribution and the viscosity of the liquid phase. The apparatus of the process of the invention allows solids having particle sizes of >1 µm to be separated off. The separation is improved by increasing particle size and an increasing density difference.

The separation efficiency of the apparatus of the process of the invention can be matched to the respective separation task within wide limits by changing the construction of the apparatus and adjusting the operating conditions. In a first preferred embodiment, the construction of the apparatus can be altered by adjustment of the number of sedimentation trays n, the inclination of the sedimentation funnels, the geometry of the sediment outlet and of the supernatant liquid outlet and also the geometric configuration of the flow zone. In a second preferred embodiment, the construction of the apparatus can be altered by adjustment of the number n of the levels of the cross-arm agitator, the vertical spacing of the levels and the shape of the stirrer blades or stirrer arms.

Advantageous operating conditions are achieved by adjusting the inflow and outflow rates of solid/liquid mixtures, the inflow rate of the second liquid phase or the rotational speed of the cross-arm agitator.

It is also possible to use a plurality of apparatuses connected in series. This arrangement improves the separation efficiency for a given throughput.

The invention will now be illustrated with the aid of a drawing and an example.

BRIEF DESCRIPTION OF THE DRAWINGS

The drawings consist of FIG. 1, FIG. 2 and FIG. 3.

Figure 1:
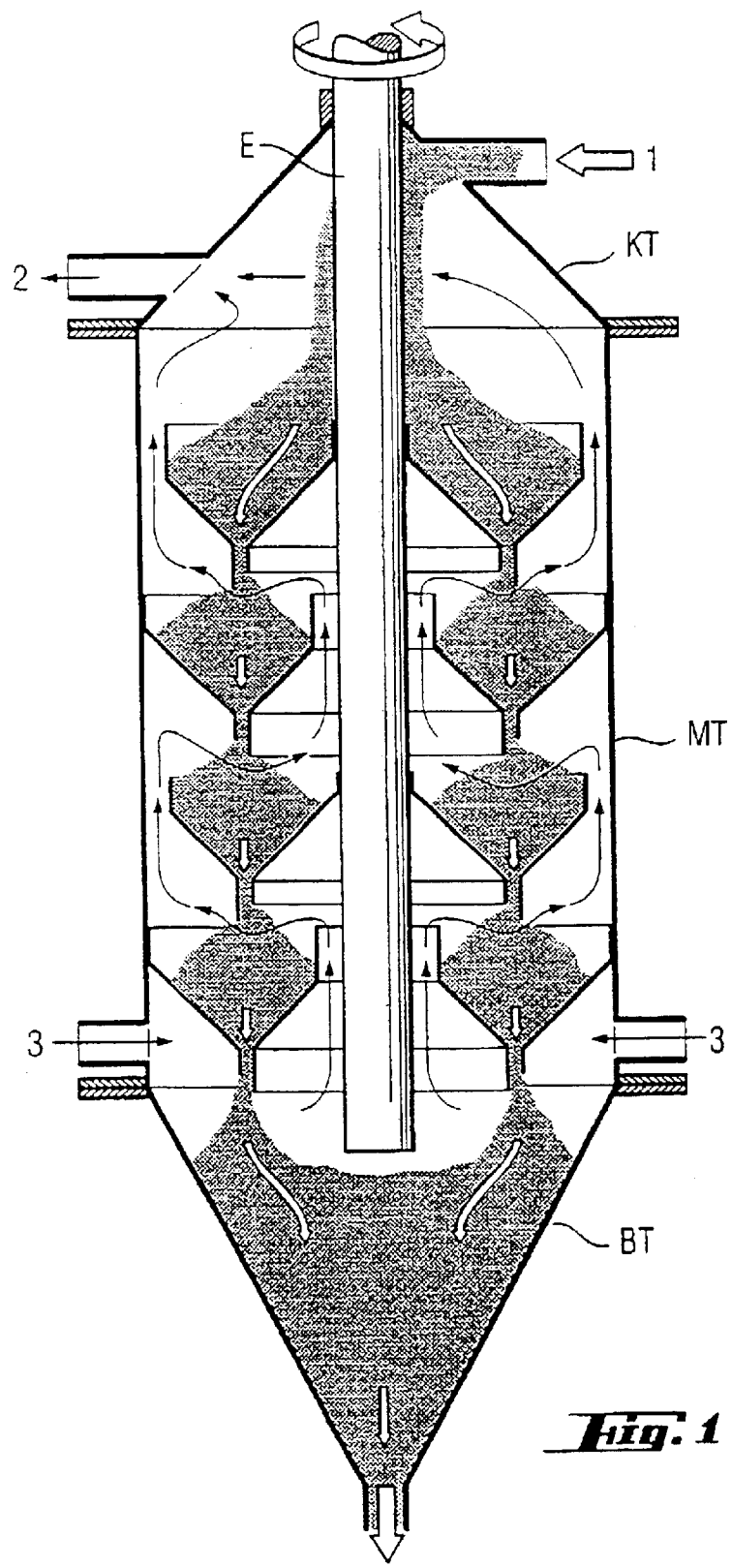
FIG. 1 shows, by way of example, a first preferred embodiment of the apparatus of the process of the invention as sedimentation apparatus.
Figure 2:
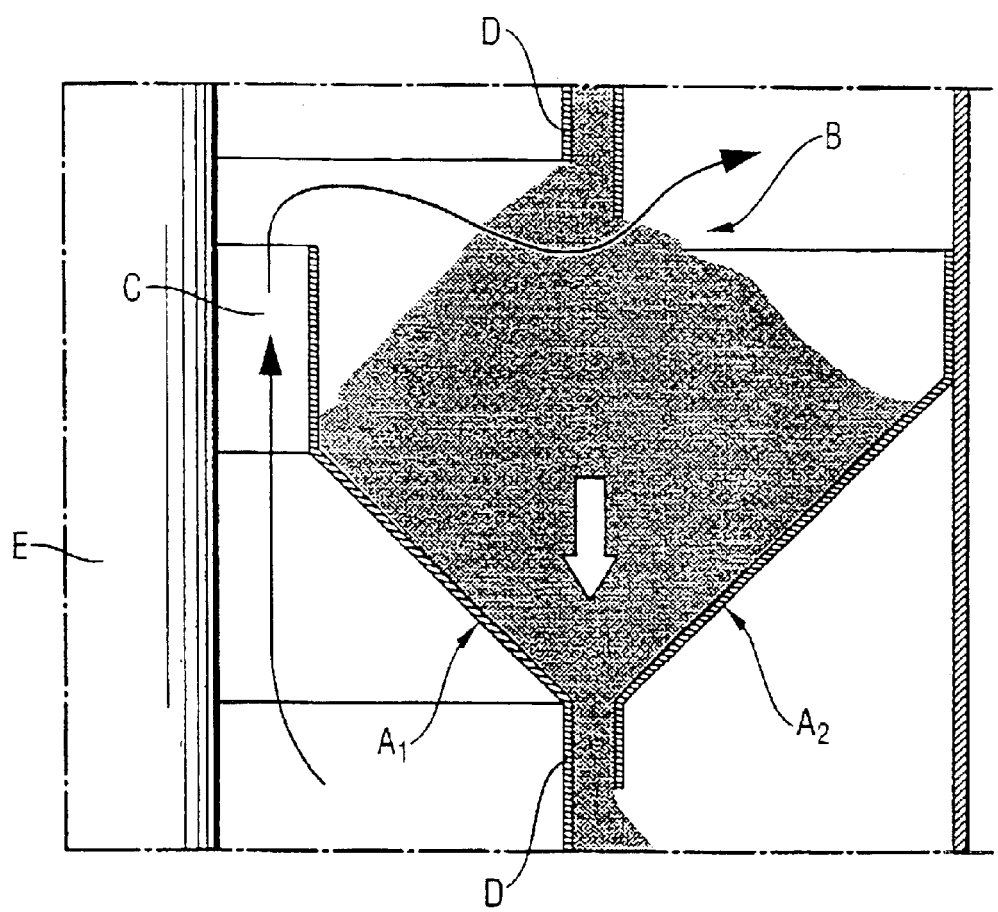
FIG. 2 shows a part (repeating unit) of the apparatus in FIG. 1.

The apparatus of FIG. 1 and FIG. 2 has at least one sedimentation funnel (A) with sediment outlet (D), at least one flow zone (B) and at least one supernatant liquid outlet (C).

The bottom section (BT) of the apparatus shown in FIG. 1 has a funnel-like construction and ends in a bottom outlet which at the same time represents the solid/liquid outlet (4). The top section (KT) has an inlet for the solid/liquid mixture (1). The top section (KT) additionally has a liquid outlet (2). The middle section (MT) contains n sedimentation trays and has a liquid inlet (3).

A sedimentation tray (ST) as shown in FIG. 2 has a sedimentation funnel (A) with sediment outlet (D), a flow zone (B) and a supernatant liquid outlet (C). In the flow zone (B), the mixture of the first and second liquid phases flows from the supernatant liquid outlet (C) of the next lower stage through the loose bed of solid and effects at least partial displacement washing. A sedimentation funnel as shown in FIG. 2 comprises an inner funnel segment (A1) and an outer funnel segment (A2). The inner funnel segments (A2) are fixed to a rotatable central shaft (E).

Figure 3:
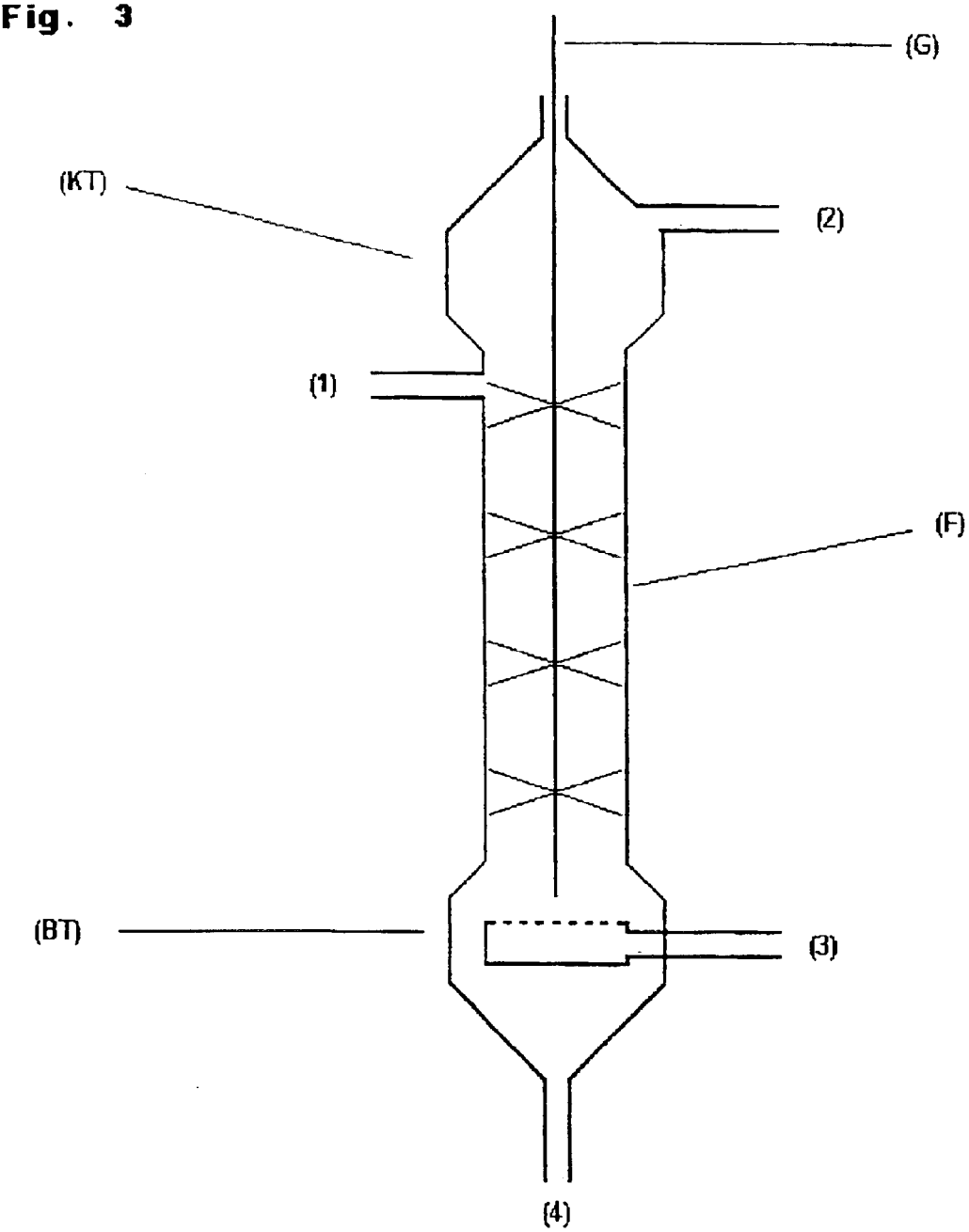
FIG. 3 shows a second preferred embodiment of the apparatus for carrying out the process of the invention.

The apparatus of FIG. 3 has a straight tube (F) and a central stirrer shaft (G). The stirrer shaft bears cross-arm agitators arranged above one another in a plurality of levels. Each level has at least four round stirrer arms which extend almost to the wall.

The bottom section (BT) of the apparatus shown in FIG. 3 has a funnel-like shape and ends in a bottom outlet which represents the solid/liquid outlet (4). The top section (KT) is provided with the liquid outlet (2). The upper end of the tube (F) has an inlet for the solid/liquid mixture (1). The washing liquid is introduced via the inlet (3).

EXAMPLES

Example 1

An experimental apparatus of the type shown in FIG. 1 having a diameter of 120 mm was used. The apparatus had 20 sedimentation trays.

400 g per minute of a mixture of 25% by weight of polyphenylene sulfide and 5% by weight of solid sodium chloride suspended in N-methylpyrrolidone (containing 5% by weight of water) were fed at a temperature of 65° C. into the solid/liquid inlet (1) of the apparatus shown in FIG. 1. At the same time, 300 ml per minute of water were fed at a temperature of 50° C. into the liquid inlet (3). 300 g per minute of a suspension of 100 g of polyphenylene sulfide in 200 g of water were taken off through the solid/liquid outlet (4). The polyphenylene sulfide suspension in water which was taken off contained less than 0.5% by weight of the sodium chloride which had been introduced. The NMP content of the aqueous liquid phase taken off at the solid/liquid outlet (4) was less than 1%.

At the liquid outlet (2), a mixture of water and NMP containing more than 99.5% of the sodium chloride which had been introduced was discharged.

The NMP/water mixture contained over 65% by weight of NMP. No measurable discharge of PPS solid through the liquid outlet (2) was observed. To isolate the polyphenylene sulfide, the mixture was dried. The NMP/water mixture was distilled and the NMP was recovered.

Example 2

The sedimentation apparatus comprises a straight tube having a diameter of 60 mm and a length of 600 mm and provided with a multiple cross-arm agitator whose stirrer blades extend almost to the wall. The spacing of the levels of stirrer blades along the vertical stirrer shaft is 50 mm. The sedimentation apparatus with top and bottom sections is shown in FIG. 3.

The stirrer speed was set to 100 rpm. 180 g per minute of a mixture of 25% by weight of polyphenylene sulfide and 5% by weight of solid sodium chloride suspended in N-methylpyrrolidone (containing 5% by weight of water) were fed at a temperature of 65° C. into the solid/liquid inlet (1) of the apparatus shown in FIG. 2. At the same time, 110 ml per minute of water were fed at a temperature of 65° C. into the liquid inlet (3). 125 g per minute of a suspension of 45 g of polyphenylene sulfide in 80 g of water were taken off through the solid/liquid outlet (4). The polyphenylene sulfide suspension in water which was taken off contained less than 0.2% by weight of the sodium chloride which had been introduced. The NMP content of the aqueous liquid phase taken off at the solid/liquid outlet was less than 0.5% by weight.

At the liquid outlet (2), a mixture of water and NMP containing more than 99.5% of the sodium chloride which had been introduced was discharged. The NMP/water mixture contained over 65% by weight of NMP. No measurable discharge of PPS solid through the liquid outlet (2) was observed. To isolate the polyphenylene sulfide, the PPS/water mixture taken off at the outlet (4) was dried. The NMP/water mixture was distilled and the NMP was recovered.

These examples show that polyphenylene sulfide can be separated off from a mixture with sodium chloride suspended in NMP in a sedimentation apparatus without highly dilute washing liquors being obtained. The NMP can be recovered completely by distillation without vaporization of large amounts of water. The separation of NMP and sodium chloride from the PPS is significantly above 99%.

The favorable recovery of the NMP and the small loss of PPS make the process of the invention industrially interesting.

What is claimed is:

1. A process for separating a suspended polymer from one or more by-products of preparation of the polymer and a first liquid phase, wherein the suspended polymer in the first liquid phase is brought into contact with a second liquid phase in countercurrent and the suspended polymer is transferred into the second liquid phase, and wherein the process is carried out in an apparatus comprising:
   a) at least one solid/liquid inlet;
   b) at least one solid/liquid outlet;
   c) at least one liquid inlet, and
   d) at lest one liquid outlet.

2. The process as claimed in claim 1, wherein the suspended polymer is washed in countercurrent and at least partial displacement washing takes place during this washing of the suspended polymer.

3. The process as claimed in claim 1, wherein the first liquid phase comprises an organic solvent as main constituent and the second liquid phase comprises water as main constituent.

4. The process as claimed in claim 1, wherein the main constituent of the suspended polymer is a polyarylene sulfide.

5. The process as claimed in claim 1, wherein the proportion of first liquid phase, based on the second liquid phase, in the solid/liquid mixture discharged through the outlet (4) is less than 50% by weight.

6. The process as claimed in claim 1, wherein the proportion of second liquid phase, based on the first liquid phase, in the liquid discharged through the outlet (2) is less than 80% by weight.

7. The process as claimed in claim 1, wherein the first liquid phase and the second liquid phase are miscible.

8. The process as claimed in claim 1, wherein the density of the suspended polymer is different from the density of the first liquid phase and of the second liquid phase.

9. The process as claimed in claim 1, wherein the apparatus has n stages and n is an integer <1.

10. The process as claimed in claim 1, wherein the suspended polymer travels through the apparatus by sedimentation under gravity.

11. The process as claimed in claim 1, wherein the suspended polymer does not sediment directly in a direction opposite to the flow of the ascending washing liquid in the individual sedimentation trays.

12. The process as claimed in claim 1, wherein the apparatus comprises at least one top section (KT), at lease one bottom section (BT) and between them at least one middle section (MT) having n sedimentation trays.

13. The process as claimed in claim 1, wherein a plurality of apparatuses are connected in series or in parallel.

14. An apparatus for separating a suspended polymer from a first liquid phase, constructed such that the suspended polymer in the first liquid phase is brought into contact with a second liquid phase in countercurrent and the suspended polymer is transferred into the second liquid phase, and wherein the apparatus comprises:
   a) at least one solid/liquid inlet,
   b) at least one solid/liquid outlet,
   c) at least one liquid inlet,
   d) at least one liquid outlet,
   e) a plurality of sedimentation trays arranged one above another, each tray having a flow zone directing sediment to a sediment outlet and a supernatant outlet, the trays being constructed such that the supernatant outlets are staggered and such that supernatant from a supernatant outlet of at least one tray flows across the flow zone of the next sedimenation tray above it without hindering the directing of sediment.

15. An apparatus as claimed in claim 14, wherein the suspended polymer is washed in countercurrent and at least partial displacement washing takes place during this washing of the suspended polymer.

16. An apparatus as claimed in claim 14 wherein each sedimentation tray (ST) comprises at least one sedimentation funnel.

17. An apparatus as claimed in claim 14, wherein the suspended polymer does not sediment directly in a direction opposite to the flow of the ascending washing liquid in the individual sedimentation trays.

18. An apparatus as claimed in claim 14 which comprises at least one top section (kT), at least one bottom section (BT) and between them at least one middle section (MT) having n sedimentation trays.

19. An apparatus as claimed in claim 14, wherein a plurality of apparatuses are connected in series or in parallel.

* * * * *

UNITED STATES PATENT AND TRADEMARK OFFICE
CERTIFICATE OF CORRECTION

PATENT NO. : 6,818,132 B2
DATED : November 16, 2004
INVENTOR(S) : Michael Haubs et al.

It is certified that error appears in the above-identified patent and that said Letters Patent is hereby corrected as shown below:

Title page,
Item [57], ABSTRACT,
Line 2, delete the second occurrence of the word "separating".

Column 7,
Line 13, the word "lest" should be -- least --.
Line 39, the term "<1" should be -- >1 --.

Column 8,
Line 2, the word "lease" should be -- least --.
Line 25, the word "sedimenation" should be -- sedimentation --.

Signed and Sealed this

Fifth Day of April, 2005

JON W. DUDAS
*Director of the United States Patent and Trademark Office*